US006802068B1

(12) United States Patent
Guruprasad

(10) Patent No.: US 6,802,068 B1
(45) Date of Patent: Oct. 5, 2004

(54) ADDRESSLESS INTERNETWORKING

(75) Inventor: Venkata Guruprasad, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,025

(22) Filed: Aug. 3, 1999

Related U.S. Application Data

(63) Continuation-in-part of application No. 08/733,044, filed on Oct. 16, 1996, now abandoned.

(51) Int. Cl.[7] .......................... G06F 13/00; G06F 15/16; G06F 15/173

(52) U.S. Cl. ........................ 719/319; 709/245; 709/238; 709/230; 709/227; 719/313

(58) Field of Search ................................ 709/200–253, 709/319; 719/319, 313, 310

(56) References Cited

U.S. PATENT DOCUMENTS

| | | | | | |
|---|---|---|---|---|---|
| 5,142,622 | A | * | 8/1992 | Owens | 709/227 |
| 5,434,974 | A | * | 7/1995 | Loucks et al. | 707/101 |
| 5,577,252 | A | * | 11/1996 | Nelson et al. | 718/100 |
| 5,729,689 | A | * | 3/1998 | Allard et al. | 709/228 |
| 5,867,656 | A | * | 2/1999 | Iwasaki et al. | 709/215 |
| 6,154,777 | A | * | 11/2000 | Ebrahim | 709/227 |
| 6,282,569 | B1 | * | 8/2001 | Wallis et al. | 709/224 |
| 6,314,469 | B1 | * | 11/2001 | Tan et al. | 709/245 |
| 6,446,133 | B1 | * | 9/2002 | Tan et al. | 709/245 |
| 6,505,210 | B1 | * | 1/2003 | Frey et al. | 707/103 R |
| 6,567,818 | B1 | * | 5/2003 | Frey et al. | 707/103 R |
| 6,687,761 | B1 | * | 2/2004 | Collins et al. | 719/315 |

OTHER PUBLICATIONS

Radia, Sanjay et al. "The Spring Name Service." Sun Microsystems. Nov. 1993.*

Mevel, Franck et al. "Distributed Communication Services in the Masix System." IEEE. May 1996.*

A. Schade, M. Kaiserworth, P. Trommler, Object Instrumentation for Distributed Applications Management, pp. 1–13, Proceedings of the International Conference on Distributed Platforms, ICDP'96, Dresden, German.

(List continued on next page.)

*Primary Examiner*—Lewis A. Bullock, Jr.
(74) *Attorney, Agent, or Firm*—Louis J. Percello; F.Chau & Associates, LLC

(57) ABSTRACT

Uniform and infinitely scalable system and method for communication between application processes providing both point-to-point and multi-point connectivity without dependance on end-to-end addressing, using a framework of nameservers as exchanges for sharing named contexts of communication. Application processes define and reference the contexts by name on nameservers addressed by pathnames, and the framework then synthesises the end-to-end transport between the requesting processes by first concatenating the service paths taken by the defining and referencing requests to form end-to-end service paths, and then using these end-to-end service paths to perform the requisite signalling to the underlying physical networks for setting up the transport. Only local references are used in the configuration of the nameservers and switches, and in the computation and signalling of the service and transport paths, respectively. Each shared context provides a virtual network address space for multiple, simultaneous connections, and the contexts also serve as in-network framework for hosting connection management facilities, including in-network authentication, as well as transport mechanisms providing diverse qualities of service.

18 Claims, 4 Drawing Sheets

Synthesis of transport paths

OTHER PUBLICATIONS

R. Atkinson; Security Architecture for the Internet Protocol; Naval Research Laboratory; Network Working Group Request for Comments: 1825; pp. 1–21, Aug. 1995.

R.E. Gilligan et al.; Basic Socket Interface Extensions for IPv6; Internet Engineering Task Force; Internet Draft, pp. 1–25; Apr. 16, 1995.

Hymas et al., ATM Extensions to the Socket Programming Interface in AIX 4.2, pp. 1–10, RS/600 Online Publications, 1994.

W. R. Stevens, "Subnet Addresses", Unix Network Programming, pp. 202–203, 216–217, Prentice–Hall 1990.

* cited by examiner

Service and transport networks

Synthesis of transport paths

Multipoint connectivity

Typical host data structures

Point-to-point client

Multipoint client

ADDRESSLESS INTERNETWORKING

CONTINUATION DATA

This application is a continuation-in-part of application Ser. No. 08/733,044, filed Oct. 16, 1996, now abandoned, the disclosure of which is incorporated-by-reference in its entirety herein.

BACKGROUND OF THE INVENTION

1. Technical Field

This invention pertains to computer communication and information networking. More particularly, it concerns generic application level connectivity without depending on an end-to-end network address space.

2. Description of Background Art

Prior networking art embodies a long standing perception that even logical, or application level, connections must be determined by uniquely identifying the physical end points, ie. by a globally unique addresses. The belief is central to the Internet Protocol (IP) suite and is enforced by almost all network application programming interfaces (APIs), including the Berkeley sockets. A symptom of this approach is that the application end points are directly exposed, in the form of (IP_address, port_number) tuples, allowing room for inadvertent or malicious connections, unless protected by a firewall; applications must defend themselves by validating the protocol (eg. HTTP), using magic cookies (eg. the X protocol), or by encryption (eg. SSL). It would also improve security somewhat if the identity of the final destination were concealed or eliminated from the data packets, because anonymous data is often less useful.

More importantly, an IP address is merely a symbolic substitute for the network end point, which means that, notwithstanding its role as an inter-networking architecture, IP does not really solve the problem of confinement by network address boundaries, but works around it by emulating a global end-to-end virtual network: IP applications can run across heterogeneous component networks, but only if the end-point physical hosts (or network interfaces) bear unique IP addresses. This was a strength in the early days of the Internet, because fixing the basic transport format first was crucial to the collaborative development and deployment of the infrastructure protocols of the IP suite. Nevertheless, it has left IP inherently restricted to a finite address space, which means one must currently resort to embedding techniques, such as tunnelling and Network Address Translation (NAT), to extend the existing infrastructure. The restriction more generally means that the associated data structures and protocols must be hardcoded into application software or middleware, and it limits the flexibility and power available to these programs in ways that will be become clear from the description of the present invention.

Accordingly, it is important to avoid application-level dependance on addressing, but because of its crucial role in the development of the Internet, IP-like addressing is commonly assumed to be both necessary, in that any sound scheme for internetworking is expected to critically depend on end-to-end fixed length addresses, andsufficienteven for future internetworking frameworks and applications. These notions are reflected in the view, formalised by the ISO open systems interconnection(OSI) seven-layer model, that the transport mechanism must be solved independently of the other layers,without any help from the latter. This is an undue restriction and a very wrong assumption, as will be particularly shown by the description of the present invention, which exploits simple techniques from the client-server model and operating system (OS) and compilation domains to solve the transport problem in fundamentally different way. The assumption is manifest in the existing specifications of switched networks, including X.25 and Asynchronous Transfer Mode (ATM), which require the signalling to depend on preassigned globally unique multi-byte addresses for the individual switches and host interface adapters. The addressing is currently needed to enable application processes to identify the final destinations without intimate knowledge of the network configuration, only because the current frameworks, such as ATM's network-network interface (NNI) and user-network interface (UNI), were once again conceived without considering higher layer techniques. The result is double addressing and signalling when ATM is used as transport under the IP suite, once for establishing the virtual circuits and once more for emulating IP subnets and virtual LANs (VLANs). Surprisingly, the two-level approach of the present invention, involving connection-oriented networking even over IP, manages to eliminate this duplication.

Another duplication of function concerns the name service. In the earlier Unix-to-Unix Copy (UUCP) system, client applications were required to identify successive hosts all the way to the destination, which put the burden of route discovery and specification squarely on the clients and made the system quite unscalable. The Domain Name Service (DNS) name strings still trace out a logical path to the destination through the DNS hierarchy, but IP goes to the other extreme of not using this logical path structure at all in the routing of data. Instead, IP server applications simply listen at port numbers on their own respective hosts, and their clients are expected to locate them by their host names. This makes the hierarchical organisation of the DNS critical to its operability, as each client's nameserver would otherwise need to be able to locate every server in the IP universe with no geographical hints from the client applications whatsoever.

Also, IP's prescribed use of the addresses for routing is turning out to be inefficient in some ways, and the functionality is now being replaced by Multi-Network Label Switching (MNLS), in which routing labels are affixed to the packets within the network, introducing further duplication into the scheme. Every duplication means avoidable computational or bandwidth overheads, in addition to increased development and maintenance costs. Furthermore, the packet address fields are being extended to implement IPv6, along with the corresponding infrastructure, processing and communication overheads, in every packet, application program, host and router, principally in order to accomodate the growing IP membership. These costs could have been considerably avoided had the Internet not been address space-dependent.

Additionally, per the traditional prescription, the final destination addresses must be interpreted at every router, bridge and gateway along the way. There is no protocol-independent notion of logical connectivity in the IP suite, nor in other address-oriented internetworking suites of the past, so that every logical transport path must be freshly established on a per-packet basis. The difficulty and limitation this imposes is that between any given pair of application end-points, the connectivity must be independently established for each transport stream, and depending on the protocol, may not be possible at all. This is becoming especially clear with the emergence of streaming multimedia applications, where the clients conceptually make logical connections over TCP using HTTP, but the preferred media streams involve RTP over UDP and are stopped by most corporate firewalls. The problem is currently addressed by application-level proxies, but this is a piece-meal approach, as newer protocols are being formulated all the time, and is an impediment to the development of newer network applications. For example, the SOCKS V5 protocol finally supports UDP relay, but applications still need to be specially compiled and linked, or the OS specially SOCKSified, for it to work, and it provides only one-way traversal across a set of firewalls. If the networking were instead inherently connection-oriented, firewall traversals would never have been a special issue, since the authentication could then be applied to the logical connection once, as will be demonstrated by the present invention, for any number of firewalls and transport streams.

In any case, IP addresses are losing their one-time significance as long term identifiers of client hosts, as more and more clients use dial-up connections via Internet Service Providers (ISPs) and even office equipment is migrating to Dynamic IP. A similar trend may be noticed in the server space, as servers of every kind migrate to the Hypertext Transport Protocol (HTTP) and its derivatives, and are referenced by DNS names rather than by IP addresses in the prescribed Universal Resource Locators (URLs). The client references are likewise transparently redirected for load balancing and geography-specific service. As IP addresses thus become all but invisible to the users, it would seem that the application and user level functionality should be eventually served solely by the DNS, and that IP addresses would be essentially confined to the routing and transport layers, but, as mentioned, even these functions are being taken over by switching.

It should be understood that it is neither feasible nor intended to eliminate addressing altogether. Addressing, in the sense of distinguishing destinations, is unavoidable at the lowest level, for instance, between interfaces to a switch and successive Local Area Network (LAN) drops, and indispensable, in the sense of fixed-length addresses, for routing efficiency within LANs. It is between networks, especially disparate networks like ATM and Ethernet, and at corporate, political and geographic boundaries, that the efficiency benefits of fixed-length addressing appear to be outweighed by the address space limitation inseparable from the fixed-length property, and by the administrative costs of address management in addition to those for DNS-like name space allocation, which is unavoidable in any case. Fixed-length addressing is thus an inherently low level issue of primarily local, implementational significance, and deserves to have no visibility at the level of applications and users, which would be better served by some form of indirection that would achieve the same efficiency but without the address space limitation.

Another limitation of the addressing approach is that the associated network APIs become inherently oriented toward point-to-point connectivity, and are neither elegant nor sufficient for encapsulating multipoint connectivity required in distributed parallel applications. This functionality is currently addressed, for example, by the Message Passing Interface (MPI) and the Parallel Virtual Machine (PVM) libraries, and related functions like message queuing, quality-of-service (QoS) negotiation, etc. are currently handled by custom libraries and services. A simple and elegant OS abstraction is needed to provide these functions in the future. A networking abstraction is also needed to complement such facilities, for instance, by providing in-network application-oriented functionality, which is currently being explored in the active networks field.

Accordingly, an object of this invention is to provide an uniform and infinitely scalable device or process for establishing and managing communication between application processes across diverse networks and internetworks. A further object is to provide such adevice or process means with the least duplication of functionality. Another related object is to eliminate the existing need for a single end-to-end network address space and the identifiability of the final destination host from the contents of data packets.

Another object of the invention is to provide uniform means in the operating system to support both point-to-point and multipoint connectivity. A related object is to provide uniform support in the network for application-oriented facilities.

SUMMARY OF THE INVENTION

These objects, and others which will be apparent, are achieved in the present invention essentially by providing means for application processes to request connectivity and for setting up the requested connections without requiring an end-to-end address space. Generally, the illustrative system and method according to the invention comprises a plurality of hosts executing application processes, a network of transport media connecting the hosts, a service network of nameservers to enable application processes executing on respective hosts to define and reference by name, one or more shared contexts of communication on specific nameservers, and to translate the service paths over the service network, obtained from the defining and referencing requests, into transport paths for data between the application processes. More particularly, each defining or referencing request identifies a nameserver on which to define or reference a context by a pathname given with the request; each host is configured to pass each defining or referencing request of its application processes directly to one or more neighbouring nameservers to be propagated through the service network to the identified nameserver; each such propagation path, comprising a sequence of names beginning with the requesting host and including the successive nameservers along the path, is construed as a request service path; end-to-end service paths are then constructed between the defining and referencing application processes by concatenating the corresponding request service paths; the concatenated service paths are translated, using configured or dynamically generated routing rules, into transport paths within the transport network; and the transport paths are then realized as virtual paths by signalling performed by the nameservers and the requesting hosts to the routing entities, including routers, bridges, gateways or switches, of the transport network.

At each node of the service network, more than one nameserver system may be configured to serve in parallel or as standby, for load balancing, robustness and fault tolerance. For the same purposes, as well as for ensuring adequate bandwidth or other qualities of service, more than one service path may be constructed for each defining or referencing request and more than one transport path may be constructed for each referencing request. Furthermore, the service network and the transport paths may be constructed over the same or different transport media, as well as utilize any kind or combination of media for a given transport path, including and not limited to dedicated point-to-point lines, address-oriented networks, such as Ethernet, circuit-oriented networks, such as ATM. In particular, the last segment of a virtual path leading to a simple client host handling only one active application connection, for example, a networked temperature sensor, would require no information within the data stream to distinguish between virtual paths, so the virtual path would be trivially equivalent to the physical path itself. Similarly, a virtual path whose end-point hosts happen to lie in the same Ethernet or IP network would not need signalling because the destination address provided by the underlying network suffices as the virtual path.

Since references are made to a context at a nameserver, rather than to a server host address, the invention does not have the inherent point-to-point flavour of prior art networking, and the user and programming interfaces necessary for the invention are equally convenient for providing multipoint communication between application processes, suitable, for instance, for distributed parallel processing. Additionally, the necessary peer-to-peer service and transport paths are automatically obtainable by combining the corresponding end-to-end paths initially obtained individually for each peer process. In prior art, the end points of the transport paths are provided to the application processes as handles or file descriptors. Advantageously in the present invention, the end points obtained from a given context are uniquely identifiable within that context and thereby form a virtual network address space special to that context.

Further, a concatenated service path itself constitutes an end-to-end route between the respective hosts of a pair of defining and referencing application processes via the nameserver network, and suffices as an end-to-end signalling framework for setting up the requisite transport paths. Whether setting up an individual link of the service network or a segment of a transport path, only the physical path or medium directly leading to the next nameserver, routing entity or host needs to be identified, requiring only local addressing to distinguish the immediate destination from other such entities already plugged, or likely to be plugged, into the same path or medium. Thus, only local addressing is at all used within the system, and global addressing occurs only in the form of the request pathnames. Since the pathnames and their service paths can be of any length, the present invention is inherently capable of serving an unlimited number of physical hosts and contexts, with each of the latter constituting a virtual network address space in its own right.

The notion of locality extends to the computation of possible transport paths for a given service path, because this too requires knowledge only of the physical links of the transport network, together with access to the corresponding switches, within a reasonable physical or geographical neighbourhood of the service path. It is thus assumed, for the workability of the present invention, that each nameserver can indeed be configured with access to adequate number of switches in its neighborhood, and to arrange for it to learn, from configuration files, signalling interaction with the switches or other means, of the links configured on these switches. An analogous assumption of local configurability exists in prior art, since the DNS servers must be configured with the hostnames and allocated IP addresses, hosts are configured, statically or dynamically, with the DNS server addresses, and both hosts and routers are configured with "default routes" to known routers.

An illustrative embodiment according to the present invention includes availability of routing rules at one or more of the nameservers along the concatenated service paths for computation of transport path segments at these nameservers; signalling communication between these nameservers and the routing entities of the transport network to setup or teardown corresponding segments of the transport paths; and linkage communication among these nameservers and the requesting hosts to connect the transport path segments for completing the end-to-end transport paths. Alternatively, the whole or portions of the concatenated service paths may be passed back to the requesting hosts and the signalling for realizing the corresponding transport segments or paths performed directly by the requesting hosts. Additionally, one or more of the hosts may include operating system means to encapsulate the service communication with the nameservers, including the defining and referencing requests, the signalling communication if any, and the linkage communication as operating system services available to the application processes executing on those hosts.

An alternative of an embodiment of the invention is configuration of the service network as a directory tree of nameservers, and uniform interpretation of the request pathnames with reference to this tree. The present invention is not as critically dependent on a strict hierarchical configuration of the name service as the prior art, since the application processes supply the complete name service paths, via the request pathnames, and the nameservers are not as burdened with the responsibility of discovering remote hosts. It becomes feasible, therefore, as well as efficient and cost-effective, to implement multiple hierarchies to suit political, geographical and corporate boundaries, since applications seeking connections across such boundaries are empowered to expressly request such traversals.

At the other extreme, an embodiment may choose to implement no hierarchy at all, in which case, the pathnames would need to be literally interpreted as the request service paths, but here, too, the invention makes a fundamental improvement over the prior art analogy of UUCP, since the nameservers would then act purely as exchanges where the clients and servers can meet, with reduced burden of routing and none of discovery. The only difference visible to the application processes between the hierarchical and the "flat" configurations is that the defining and referencing request pathnames would be identical in the first and complementary in the second.

Generally, the illustrative method of the present invention favors circuit or path oriented routing over the packet routing of IP. This is not at all a detriment, because the long haul routes are already based on ATM, an increasing number of corporate networks use ATM VLANs and optical fibre is becoming the medium of choice for future building networks and home connections. The present invention would thus eventually provide a uniform application level service appropriate to this emerging transport media without emulating IP, as in the current generation of ATM VLANs, and without requiring severe redesign of existing applications in adapting to the ATM paradigms, since it essentially generalises the bind-connect paradigm of client-server design. It will become clear from the detailed description that IP and packet routing remain convenient and usable as local transports under the current invention, as limited extensions of the basic Ethernet. The invention provides a way to integrate multiple local IP networks in a manner more directly reflecting the path oriented character of long-haul transport, and conversely, confines the direct use of packet or address-oriented routing to local routes. This also means that the present invention can be easily deployed over existing IP, the effect being to merely replace calls to the DNS, via gethostbyname and related functions in the sockets API, with those to the service network of the present invention. Performance is also not adversely impacted, but appears likely to be improved since the nameservers are not burdened with network discovery and the only changing data to be handled is that of the application-defined contexts and the associated service and transport paths, all of which can be extremely transient, as while debugging an application, or long lived as services well beyond the useful lives of their host hardware, and to which known techniques like caching can be easily applied for performance.

The present invention also achieves an improvement in host security, since client applications cannot even request connections until their respective servers have advertised their services as contexts on the nameservers. By definition, as it were, network security cannot be perfect because data can always be physically intercepted, any set of network protocols broken into and mimic'd, and every network of non-trivial dimensions invariably contains both intentional and inadvertent vulnerabilities. In absense of end-to-end addressing, however, hosts outside the immediate LAN cannot be easily identified by intercepting their data, thus providing some measure of security-by-anonymity. Fundamentally achieved are inherent isolation and potential for incorporating security mechanisms, which can both be appreciated by analogy to the Unix operating system, in which the in-memory data of an individual process is first protected from inadvertent access or corruption by other processes by isolating it in a per-process virtual memory address space. The present invention likewise isolates the in-network data of individual application contexts by context-specific virtual address spaces and virtual paths, as well as confining address-oriented routing to local segments, analogous to the use of physical memory in Unix. More significantly, since the present invention provides a generic connection-oriented framework, in the form of the end-to-end service paths, tied to the actual transport paths used for the application data, it is ideal for providing both traditional and multi-media services traversing any number of gateways and firewalls.

Additionally, in-memory and file data are protected in Unix by authentication and access control mechanisms that have been added to and considerably improved over the default mechanisms of the early versions of the operating system. Analogous default mechanisms are meaningless in the networking context, but the present invention does provide room for implementing these functions within the service network, to allow defining requests to specify application of these functions to their contexts, thus protecting server applications, and to correspondingly verify the privileges of both defining and referencing requests, thereby preventing unauthorized application processes from posing as legitimate services and, among other possibilities, stealing sensitive data such as passwords from unwary clients. Alternatively, an embodiment may pass referencing requests, via the end-to-end service path, to the server application process for verification and approval by the latter before realising the transport paths to fulfill the requested connection. A further advantage of the present invention is the sharing or transfer of the server application's responsibility for authentication and access control among the processes sharing its context. Another option is the granting of access for limited time, and automatic initiation of teardown signalling on expiration of the granted period, to limit the exposure of server applications to network attacks.

Other objects, features and advantages of the present invention will be apparent when the detailed description of the preferred embodiment is considered in conjunction with the drawings, which should be construed in an illustrative and not limiting sense as follows.

DETAILED DESCRIPTION OF THE INVENTION

Figure 1:
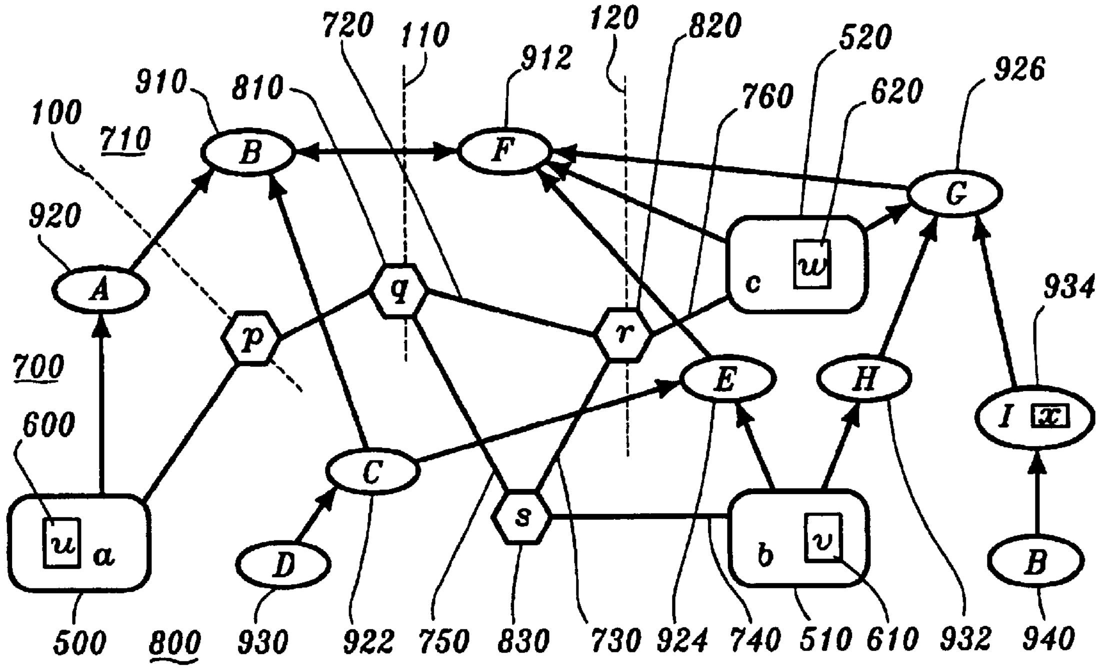
FIG. 1 illustrates the propagation of defining and referencing requests and the construction of the service paths in accordance with an amendment of the present invention.

FIG. 1 illustrates the structure of the preferred embodiment, comprising a service network of nameservers [910], [912], [920], [922], [924], [926], [930], [932] and [940]; a transport network of switches [800], [810], [820] and [830], a multitude of hosts [500], [510] and [520] executing application processes [600], [610] and [620], respectively, and physical transport media [700], [710], [720], [730], [740], [750] and [760], connecting the hosts and the switches as shown. The configuration of the service network is largely, but not strictly, hierarchical; in particular, there can be multiple nameservers at the top, like [910] and [920] in the figure, and some nameservers may refer to multiple "parents", as illustrated by nameserver [922]. In accordance with the invention, each nameserver in this example carries a name,'A' through 'I' for nameservers [910], [912], [920], [922], [924], [926], [930], [932] and [934] 'A' through 'I'. Nameserver [940] is particularly named 'B' again, to illustrate that uniqueness of names is required only in a local sense. Uppercase letters have been chosen only for the purposes of the present description, because the names of the nameservers function as "non-terminals" in the translation of service paths to transport paths. In practice, any naming convention can be used that contains syntax for concatenation to form pathnames.

Purely for the purposes of the present description, the switches [800], [810], [820] and [830]are also labelled with text names as 'p' through 's', respectively, as are the application processes [600], [610] and [620], labelled as 'u', 'v' and 'w', and the hosts [500], [510] and [520], labelled as 'a', 'b' and 'c', respectively. The host names refer to the hosts themselves rather than to their (transport) network interfaces as in prior art. The process, switch and host names merely symbolise internal representation of local references in the discussion, and do not imply the formation of, or need for, a universal namespace.

According to an embodiment of the present invention, to obtain a transport path for communicating data, a first application process 'u' [600] executing on a first host 'a' [500] first makes a defining request def('//*F*/*G*/*I*/*x*'). Ex. 1 in order to create a shared context of name 'x' on the nameserver 'I' [934], and a second application process 'v' [610] executing on a second host 'b' [510] then makes a similar referencing request ref('//*F*/*G*/*I*/*x*'), Ex. 2 to the same context. It should be noticed that the contexts can be defined on any of the nameservers, not necessarily on the "leaves" of the service network hierarchy. In any case, it is not mandatory to configure the service network hierarchically in the present invention.

To propagate the first request, host 'a' [500] analyses the given first argument '//F/G/I/x', interpreting the prefix '//' as designating the top nameserver it can eventually reach in the service network, and accordingly, passes on the request to the nameserver 'A' [920] above it. Before passing on the request, it first appends a second argument to the request, comprising a local reference to itself ('a') and a reference to the requesting application process ('u') in some internal form, symbolically representable in the present discussion as 'a/u'. This is the initial value of the request service path, to be completd as the request propagates. Nameserver 'A' [920] likewise recognises the '//' prefix and passes on the request to to its own "parent" nameserver, 'B' [910], after prepending its own name ('B') to the service path, obtaining 'A/a/u'. Nameserver 'B' [910] recognises the '//' prefix as referring to itself, since it is not configured with a "parent", and therefore looks for a peer or descendent of name 'F' to pass the request to, after, once again, prepending its own name to the service path, to form 'B/A/a/u'. Nameserver 'F' [912] recognises the request as coming from a peer, and accordingly prepends '//' to the service path. Thereafter, the service path argument remains unmodified as the request propagates downward in the hierarchy to the final nameserver 'I' [934], where the last identifier in the request pathname, 'x', is checked to make sure it does not refer to an existing context or an immediate descendent nameserver before saving the name 'x' as a context representing the service path just computed, '//B/A/a/u'. These steps of request propagation and service path computation are summarised below at '*A*'[920]: def ('*//F/G/I/x*', '*a/u*'), at '*B*'[910]: def ('*//F/G/I/x*', '*A/a/u*'), at '*F*'[912]: def ('*/G/I/x*', '*//B/A/a/u*'), at '*G*'[926]: def ('*I/x*', '*//B/A/a/u*'), and finally, at '*I*'[934]: def ('*x*', '*//B/A/a/u*'). Ex. 3

Note that the use of the nameserver names in the computed service path is again purely symbolic, since any internal representation may be used.

The reference request propagates similarly, but with an additional feature illustrating the flexibility in the present invention, since host 'b' [510] is configured with access to two immediate nameservers, 'E' [924] and 'H' [932], and therefore has the choice of passing on the request to either or both. Assuming the request goes to 'E' [924], it would be passed on to the latter's parent, nameserver 'F' [912], and from thereon descend to nameserver 'I' [934], thereby tracing the at '*E*' [924]: ref ('*//F/G/I/x*', '*b/v*'), at '*F*' [912]: ref ('*//F/G/I/x*', '*E/b/v*'), at '*G*' [926]: ref ('*I/x*', '*//F/E/b/v*'), and at '*I*' [934]: ref ('*x*', '*//F/E/b/v*'), Ex. 4

Where once again, the service path is unmodified on the way down. On receipt of the request at nameserver 'I' [934], the end-to-end service path from process 'v' [610] to process 'u' [600] is computed by concatenating the service path previously obtained,'//B/A/a/u', with that just obtained from the reference request, '//F/E/b/v', after reversing the latter, to yield 'v/b/E/F//B/A/a/u'. If the request were sent to 'h' [932] instead, it would lead to a slightly different end-to-end service path'v/b/H/G/F//B/A/a/u' by tracing the steps at '*H*' [932]: ref ('*//F/G/I/x*', '*b/v*'), at '*G*' [926]: ref ('*I/x*', '*H/b/v*'), and at '*I*' [934]: ref ('*x*', '*//F/G/H/b/v*'). Ex. 5

It should be clear that nameservers too can have such choices in the present invention, as illustrated by nameserver 'C' [922], which can choose between two "parents" 'B' [910] and 'E' [924] for its incoming requests. In the configuration shown, nameserver 'C' [922] can be influenced in its choice by the request pathname: if the pathname begins with '//B', it would be more likely be programmed to choose 'B' [910], and 'E' [924] otherwise, for optimality. In other cases, as in that of host 'b' [510], the optimal choice may not be immediately obvious, and in any case, it would be clear to those skilled in the art that such redundancy could be variously exploited to achieve, among other possible benefits, load balancing, by sending the requests through a different path each time, as well as fault tolerance and lazy optimisation, by involving both paths and selecting the more suitable of the resulting end-to-end service paths. It would also be recognised that a similar redundancy does exist in prior art, in that host configurations in IP typically include two or three DNS nameservers, although IP implementations almost never access more than one at a time, presumably in order not to overload the nameservers. The redundancy has a greater significance in the present invention because the service paths could result in different levels of performance, in both their own computation and in the subsequent signalling, and could yield transport paths differing in cost, quality of service or other properties.

That the present invention does not depend on hierarchical configuration can be verified by considering how the end-to-end service paths can be constructed without assuming the hierarchies in the above example. There would be no way for an application to specify an absolute pathname, so that all defining and referencing requests would have to bear pathnames equivalent to actual service paths, like def ('*A!B!F!G!I!x*')

and ref ('*H!G!I!x*'), respectively, Ex. 6 once again borrowing notation from prior art, in this case, from UUCP. The end-to-end service path is trivially constructed at nameserver 'I' [934] by reversing and concatenating the request pathname strings, together with the requesting host and process names as before, to get 'v!b!H!G!I!x!!x!I!G!F!B!A!a!u', and eliminating the repeated segment 'x!I!G', to obtain 'v!b!H!G!F!B!A!a!u', which is identical, but for the notational difference, to that obtained in the hierarchical setup, viz. 'v/b/H/G/F//B/A/a/u'. The alternative path 'v!b!E!F!B!A!a!u', corresponding to 'v/b/E/F//B/A/a/u', would similarly result from the corresponding referencing request ref ('*E!F!G!I!x*'). Ex. 7

Clearly, the same end-to-end service paths can be generated either way, and the difference is essentially in how the application processes address their respective contexts. Without hierarchical organisation, applications would be forced to specify pathnames that literally trace out the service paths, which would make it difficult, as was realised from UUCP, to develop widely deployable applications. It should be also noticed that although the prefix '//' serves like an implicit root nameserver, it is not really necessary to implement such a root, so long as the top level nameservers can reference one another by name as described. Hierarchy is needed, therefore, principally for the convenience of applications and users.

It should be further recognised that hierarchical context references parallel existing usage: for example, the URL'http://www.research.ibm.com:80/networking/addressless.ps' would equivalently refer to a context defined as'http://com/ibm/research.www/80/networking/addressless.ps', or reference a Web document tree served at context '80' defined on nameserver 'research.www'. The principal distinction is that the DNS syntax contains two order-reversals, at the first single-slash ('/'), separating the host and document pathnames, and at the colon (':') within the host name part, separating the port number, partly reflecting an effort, in the early days, to make the DNS appear as a flat namespace. It is quite irrelevant today for users to be able to distinguish the hostname and port number, and'http://com/ibm/research/www/networking/addressless.ps' would be a lot more meaningful. This makes even more sense considering that'http://www.ibm.com/research' is generally preferrable, and references to it have to be currently redirected to 'http://www.research.ibm.com'. The order-reversals are crucial to the IP-DNS approach, since the client applications need to distinguish the host-names in the URLs, in order to look up the server IP addresses. This requirement vanishes in the present invention, because the entire pathname starting from '//'would be simply handed, as in the preceding examples, to the service network, in which the request would be propagated till a nameserver is reached that contains the next name in the request pathname as a defined context. In the present example, the request would be propagated, in principle, to the top level 'com' nameserver, thence to the corporate 'ibm' nameserver and onto 'research', on which 'www' is a context defined by a Web server process executing on a host that the client process does not need to know or identify. The Web server thus becomes a seamless extension, as it were, of the network, and the same would hold for network file systems (NFS) and other applications that provide currently hierarchical name spaces in some form.

Each end-to-end service path obtained by combining defining and referencing requests as described above must be used to set up one or more transport paths between the requesting processes. In the example of FIG. 1, two such paths are possible between hosts 'a' [600] and 'b' [610], along the shown physical links (thick lines):

'u.a.p.q.r.s.b.v', going from host 'a' [500] through switches 'p' [800], 'q' [810], 'r' [820] and 's' [830] to host 'b' [510], via the successive physical links [700], [710], [720], [730] and [740], and 'u.a.p.q.s.b.v' following the same path but going directly from switch 'q' [810] to switch 's' [830] via the physical link [750].

Figure 2:
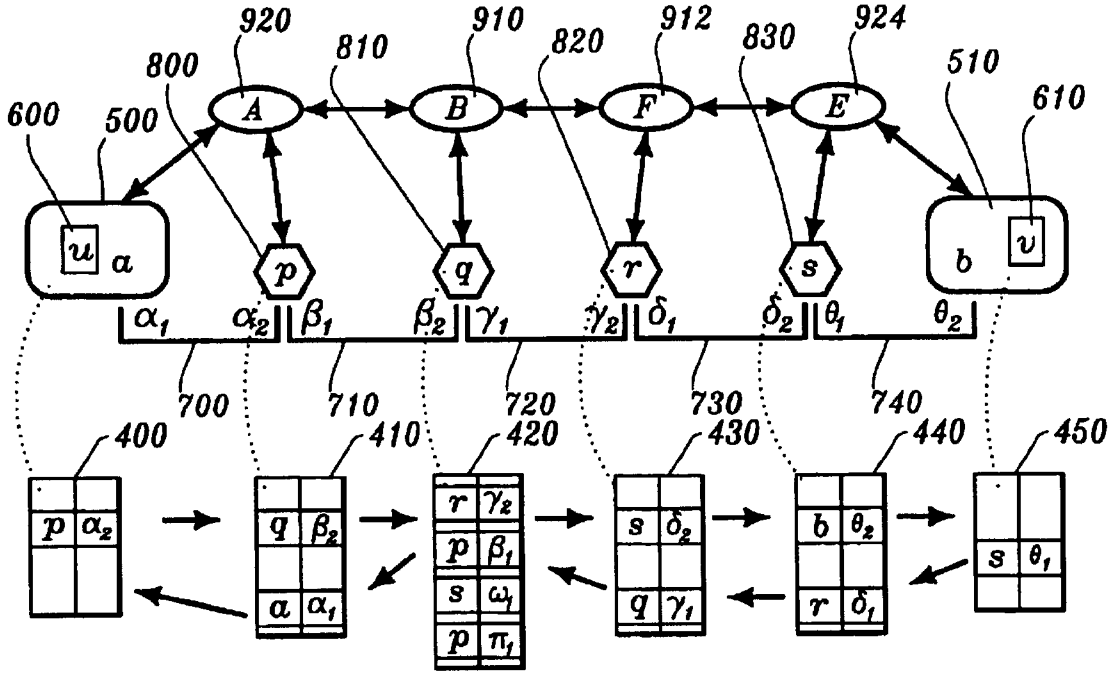
FIG. 2 illustrates a synthesis of the transport paths from the end-to-end services paths in accordance with an embodiment of the present invention.
Figure 3:
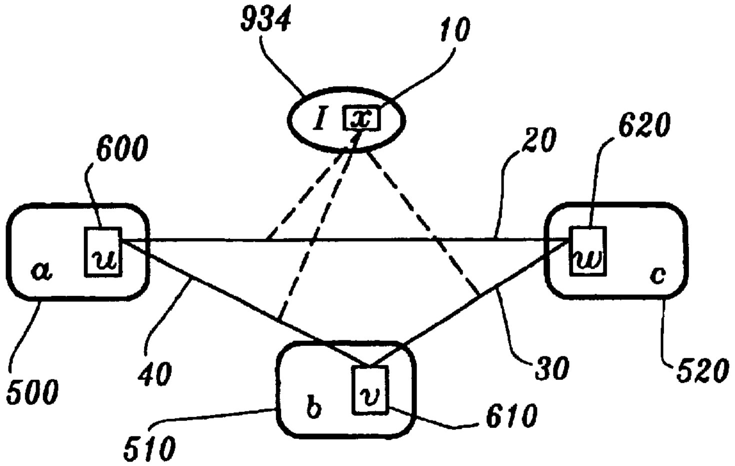
FIG. 3 illustrates multipoint connectivity enabled by an embodiment of the present invention.

FIG. 2 illustrates the virtual path implementation of the first of these,'u.a.p.q.r.s.b.v', by two rows of entries, corresponding to the forward and reverse directions, in the virtual path tables[400] in host 'a' [600],[410] in switch 'p' [800],[420] in switch 'q' [810],[430] in switch 'r' [820],[440] in switch 's' [830] and[450] in host 'b' [610], as indicated by the dotted lines. Each virtual path table entry is a tupleboldmathlangleNext×Indexrangle, whereNext is the (local) address of the next switch or host, represented here symbolically by the latter's name for sake of description, andIndex is the index to the table entry on the next switch or host, denoted here by greek letters, for onward continuation of the virtual path. The entries for a given transport path can be set up by signalling as follows.

Starting at each host, signalling requests are made to successive switches, from successive nameservers along an end-to-end service path, to allocate virtual table entries for the transport, until the other host is reached. In the present example, taking the end-to-end service path 'v!b!E!F!B!A!a!u', the return path from the server process 'u' [600] to the client process 'v' [610], requires a reference q__2 to the file handle of process 'v' [610] to be passed on, via the service path, to nameserver 'E' [924], which passes it as argument to the signalling request it makes to switch 's' [830]for allocating an entryboldmathlangleb×q__2ranglein its virtual path table [440]. The switch in turn returns the index of this entry, d__2, in its table [440] to the nameserver 'E', which passes it on to the next nameserver 'F' [912]. The latter includes the index with its signalling request to switch 'r' [820], which creates a corresponding entry boldmathlanglesxd__2ranglein its own virtual path table [430], returning the index c__2 of this entry in table [430] to the nameserver 'F', which once again passes it on to its successor in the service path, nameserver 'B' [910], which signals the next switch 'q' [810] with the index value. This switch likewise allocates an entry boldmathlanglerxc__2rangle in its table [420], and returns the resulting index b__2 to nameserver 'B', which passes it onto nameserver 'A' [920]. The latter signals switch 'p' [800], giving it the received index to insert into its virtual path table [410]a similar entry boldmathlangleqxb__2rangle and in turn obtaining index a__2to pass on to host 'a' [500]. The latter then allocates the last virtual path table entry for this path,boldmathlanglepxa__2rangle, in its own path table storage [400], and links this entry into the handle given to process 'u' [600]. The forward path from process 'v' [610] would be set up analogously, with successive table entriesboldmathlangleaxa__1rangle in path table [410], boldmathlanglepxb__1rangle in path table [420], boldmathlangleqxc__1rangle in path table [430], boldmathlanglerxd__1rangle in path table [440] andboldmathlanglesxq__1rangle in path table [450], at the switches'p' [800],'q' [810],'r' [830] and host 'b' [510] respectively, with the value a__1 similarly denoting reference into a file handle of process 'u' [600] on host 'a' [500].

To see how the virtual path mechanism works, consider a packet of data written by process 'v' [610]using its file handle, to be sent to process 'u' [600]. The first virtual path table entry, boldmathlanglesxq1rangle, is obtained from the file handle itself, where it would have been linked during the signalling. This identifies the next destination, switch 's' [830], as well as the next-hop path table index, q__1, to be sent with the packet. The local address symbolised as 's' in the table entry selects the physical link [740] by identifying, say, the slot number of the link interface card on a hardware bus inside host 'b' [510], or, say, the inode of a device file in the '/dev' directory corresponding to the link interface card, assuming a Unix-like operating system to be running on host 'b'. In general, there could be more than one virtual circuit through the same physical link to the switch; in such cases, as with ATM Adaptation Layer-5 (AAL5), the local address should also specify the particular virtual circuit to be used for this virtual path, say as (the inode of) '/dev/atm1/2934', where 'atm1' identifies the adapter and'2934' is the virtual path and circuit index (VPCI) provided by the local address for the outgoing data. On receiving this packet, switch 's' retrieves the attached value q__1to index into its own virtual path table [440], obtaining the next hop specification boldmathlanglerxd__1rangle, and sends the packet onward to switch 'r' [820] together with the new next-hop index d__1. The packet similarly travels through switches'r' [820],'q' [810] and'p' [800]. When it finally arrives at host 'a' [500], the

TABLE 1

| Configured Routing Data | |
|---|---|
| Nameserver | Known physical links |
| 'A' [920] | 'a.p' [700] (T1), 'p.q' [710] (IPv4, T1) |
| 'B' [910] | 'p.q' [710] (IPv4, T1) |
| 'F' [912] | 'q.r' [720] (Token-ring), 'q.s.' [750] (IPv4) |
| 'E' [924] | 'q.s' [750] (IPv4), 'r.s' [730] (Ethernet), 's.b' [740] (ATM OC1) |

attached index a__1 is now used to index into the file table on host 'a' to locate the corresponding file handle into process 'u' [600]. The data is then delivered to process 'u' via this file handle.

The above form of the virtual path tables and the associated method of transport are well known in prior art. What is new in the present invention is the construction and use of an end-to-end service path for setting up the virtual paths. It should be clear that the virtual paths could be arranged across dissimilar media, for example, the second physical link [730] could be Ethernet, allowing more than one switch or host to be available on the link. In this case, the local address represented by ron switch 's' [830] would include the Ethernet address of switch 'r' [820], in addition to specifying the Ethernet adapter for link [730] on switch 's'. Likewise, one or more of the physical links could be LANs using IP, for example, both the links [710] and [720], in which case, the corresponding addresses p and qcould simply be IP addresses of switches'p' [800] and'q' [810], respectively, and the path table entries could even omit the adapter identification on the switch 'q' [810], which would then be acting as an IP bridge. A less trivial example is when the two LANs are independently configured as otherwise isolated IP networks. Switch 'q' [810] would be unable to serve as an IP bridge, because identical subnet addresses could occur on both sides, and the adapter identification must be retained in the virtual path table entries on the switch. The present invention is thus able to connect IP (IPv4) "islands" without tunnelling or IP address translation (NAT) or extension (~IPv6).

In general, there would be different numbers of nameservers and switches involved for a given end-to-end service path, and a host or nameserver may need to make signalling requests to more than one switch in succession, or none at all. In the example of FIG. 2, the number of switches in the second transport path, 'u.a.p.q.s.b.v', is one less than that of the nameservers in the same end-to-end service path 'v!b!E!F!B!A!a!u', so that at least one of the nameservers would not have to do any signalling at all and would merely pass the virtual path table indices between its neighbours. It is quite possible to have the signalling done by a single nameserver or either of the hosts, provided this entity has independent service connections to each of the switches. Even in this case, the presense of the end-to-end service path provides the signalling host or switch with enough local addressing information at each step of the way for specifying the next, avoiding the need for universal addressing of the switches and hosts.

The transport paths must be computed before signalling can be performed as just described, starting with only the end-to-end service path information, available only to the application hosts and the nameservers on the service path, and knowledge of the physical links of the transport network, available by configuration, in the real world, only to the nameservers and hosts in the neighbourhoods of the respective links and switches. Importantly, the end-to-end service path is initially available only at the last nameserver reached by the referencing request, and may itself not be included in the end-to-end service path at all, as illustrated by the nameserver 'I' [934] in the preceding examples. The end-to-end service path, say 'v!b!E!F!B!A!a!u', must be propagated, therefore, via the service network, to the other nameservers included in the path, and possibly even to the application hosts,'a' [500] and'b' [510] in the current example, depending on which of the nameservers and the hosts are to be entrusted with the signalling, as described in the previous paragraph. Assuming each of the nameservers to be configured with the physical link information given for it in Table, the path translation may be represented by a grammar with the following production rules trivially derived from the table, treating the nameserver symbols as the non-terminals and the host and switch names as the terminals, (a) '*a!A*'®'*a.p*'

(b) '*p!B*'®'*p.q*'

(c) '*q!F*'®'*q.r*'|'*q.s*'|'*q.s.b*'

(d) '*r!E*'®'*r.s*'|'*r.s.b*'|'*r.c*' Ex. 8

Applying these rules to the reversed end-to-end path, 'u!a!A!B!F!E!b!v', one gets the successive transformations '*u!a!A!B!F!E!b!v*' Ex. 9

®'*u!a.p!B!F!E!b!v*' (rule *a*) (1)

®'*u!a.p.q!F!E!b!v*' (rule *b*) (2)

®'*u!a.p.q.s.b!v*' (rule *c*, last production), (3a)

or

®'*u!a.p.q.r!E!b!v*' (rule *c*, 1st production) (3b)

®'*u!a.p.q.r.s.b!v*' (rule *d*, 2nd production) (4b)

leading to both the transport paths available in the present example. Note that the remaining '!' symbols can be trivially reduced to '.' as they merely signify the path within each host between the transport network interface and the concerned application process, which is in any case constructed as file handle references during the signalling, as already described. It would be noticed that some of the productions will not lead to a successful completion; for example, either of the productions (rule d)'r!E' ®'r.s' and'r!E' ®'r.c' would exhaust the non-terminals if applied after step (3b) without yielding a path to host 'b'. Such productions are usual in translation schema and are easily addressed by backtracking, by adding rules with more context, for example:

(e) '*q!F!b*'®'*q.s.b*'

(f) '*r!E!b*'®'*r.s.b*' Ex. 10 and by other such techniques well known in the fields of parsing and compilation, as well as by exploiting caching and learning techniques to speed up convergence to the right productions. For instance, in the above example, rules (e) and (f) could be generated, or the dead production 'r!E'®'r.s' eliminated, by learning from previous applications of rules (a) through (d). Another technique is to pass on the end-to-end service path and the translated transport path representations to as many of the nameservers along or near that service path as practical, to be cached and used to speed up future translation at these nameservers. In the example above, this would allow nameserver 'e' [924], on receiving a referencing request to the same context 'x' on nameserver 'I' [934] from a possibly different process executing on host 'b' [510], to predict both the end-to-end service path and the translated transport paths from the previous computation if still present in its cache, and to initiate the signalling right away, activating the remaining nameservers'F' [912],'B' [910] and'A' [920]as necessary. The service path computations would be avoided at all the remaining nameservers, and the traffic to nameservers'G' [926] and'I' [934] significantly reduced. This is equivalent, in the above formalism, to adding rules with more non-terminals and context on the left, with the extreme example (g) '*a!A!B!F!E!b*'®'*a.p.q.r.s.b*'|'*a.p.q.s.b*' Ex. 11 corresponding to the fully cached scenario. It should be remarked, however, that contexts are temporary entities and can be undefined on termination of the server application process, or explicitly by the latter, or even by processes authorised by the server, depending on the application's usage of the context. It is therefore necessary if the paths are cached as described, to also implement cache-coherence protocols to maintain consistency of the implementation.

It should be clear that the translation of an end-to-end service can be carried out in a number of ways to obtain logical representations of one or more transport paths, each of which can be then realised by signalling as already described. It should also be easy to incorporate QoS considerations into the path translation procedure, among other ways, by including physical link capabilities in the configuration data and appropriate attributes to represent them in the translation grammar. The availability of bandwidth and other qualities, which may be obtained by querying the switches, can also be readily incorporated into the scheme. The idea is essentially to avoid computing transport paths that are doomed to be incapable of satisfactory service, and to then make the QoS reservations along the remaining transport paths during the signalling. Thus, in the preceding examples, where physical link [730] ('r.s') was assumed to be Ethernet, the productions (3b)–(4b) would be discarded if the QoS requirements call for guaranteed throughput under congestion, and production (3a) favoured, provided the alternative link [750] ('q.s') were known to be capable of providing such a guarantee, for instance, if it were Token-ring, a dedicated leased line or over ATM. In the latter case, the subsequent signalling to switches'q' [810] and 'r' [830] would need to include the desired QoS parameters for that link.

Implementation of the above ideas is fairly straightforward. Each of the nameservers may be set up either as a specially designed system or as a process running on a general purpose host, and the nameservers must be generally designed to understand a common service protocol for communicating requests and service paths, together with data for any additional features such as authentication or distributed connection management, as already mentioned. The service network connections are generally set up to be permanent and two-way, for example, as permanent virtual circuits (PVCs) in ATM, using the commands or programming interfaces specific the physical media, such as the network device driver (NDD) interface on AIX. Nameservers set up as processes on general purpose hosts would acquire file handles to such connections at start up.

Similar connections are set up between the nameservers and the switches of the transport network for signalling. Again, the signalling protocol need not be common across all switches. For example, switch 's' [830] in the preceding examples bridges between three different media, IP on link [750] to switch 'q' [810], Ethernet on link [730] to switch 'r' [820] and ATM on link [740] to host 'b' [510], so that its signalling protocol need not be the same as that of a switch merely connecting identical media, such as switch 'q' [810], which bridges two IP links. It is unnecessary to emulate virtual paths over the ATM links, for which the signalling protocols and virtual path mechanisms are already provided by the AAL5 interface. These can be directly utilised for establishing the virtual path segments across the ATM links in the transport network and linked with the virtual paths emulated over other links by the switches as just described. As a result, the present invention in effect constitutes the converse of the prior art approach, by extending ATM's connection-oriented paradigm over IP instead of the other way around.

It should also be remembered that as the switches in the present invention handle virtual paths, they perform more than the usual IP routing or bridge functions. For example, the IP address spaces across links '710' and '750' can be fully overlapped and the IP adapter on switch 'p' [800] interfacing to link '710' and the IP adapter on switch 's' [830]interfacing to link '730' can be given the same IPv4 (32 bit) address, as seen from switch 'q' [810]. Consider the entries in the virtual path table [420] of switch 'q' [810] corresponding to the transport path 'u!a.p.q.s.b!v', denoted by <s.w__2> and <x p__1> FIG. 2. The addresses s and p are required to be local, ie. as seen by switch 'q', so they must include the corresponding adapter references, say '/dev/t1link0' and '/dev/t1link1' respectively, in addition to the IPv4 destination address, which happens to be the same in this example. Switch 'q' [810] faces no ambiguity, therefore, when forwarding packets received from switches 'p' [800] and 's' [830] corresponding to the transport path 'u!a.p.q.s.b!v', since the packet headers would be containing indices to these entries in switch 'q''s virtual path table [420]. The role of end-to-end addressing would have already been handled by the service path construction, so the virtual path mechanism suffices for bridging even across overlapping network address spaces. IP is reduced to the role of local transport like basic Ethernet, and its remaining utility, under the present invention, is mainly to link multiple subnets of Ethernet, Token-ring or other such media, at a lower level, possibly to reduce the number of switches and simplify the signalling. More significantly, the example demonstrates that the present invention can be implemented and used over existing IP networks.

The localisation of network addressing makes the present invention particularly useful for implementing firewalls that allow transparent traversal by authorised users and applications. For example, if the switch 'q' [810] be configured as the only bridging means between the physical links'710', '720' and '750', there is no way for a packet arriving from link '710' to get to links '750' or '730'unless there is an active virtual path entry for it in the path table [420] at switch 'q', even though both links [710] and [750] are both defined to carry IPv4 in the present example. In order to be forwarded by switch 'q', the packet must bear a virtual path header containing the index of an active entry in table [420]. The result is a virtual firewall through switch 'q', shown by the broken line [110] in FIG. 1, that keeps unauthorised packets from the left side from reaching hosts on the right and the viceversa. It is possible for an intruder to inject a packet with an arbitrary path index in the header, but it is difficult for the intruder to guess indices that would lead to a specific destination host. The path indices could be obtained by breaking into the nameservers, but the likelihood can be reduced by ensuring that the nameservers keep no record of the indices after the signalling is complete, and more so by employing encryption or zero-knowledge techniques to pass the indices through the nameservers while setting up the transport paths as described. Many such variations and extensions are possible under the present invention and can be employed by the skilled implementer. More generally, a multitude of such firewalls can be transparently traversed, as illustrated by the lines [100] and [120] representing firewalls obtained by ensuring that the switches 'p' [800] and 'r' [820] are likewise the sole means of data transfer between links [700] and [710], and between links [710] and [760], respectively.

The authentication for application processes seeking connectivity by making defining and referencing requests, can be handled in various ways under the present invention. In particular, as suggested in FIG. 1, the nameservers themselves could be separated by firewalls. Consider, for instance, that nameserver 'F' [912] is the top namesaver behind (right of) the firewall [110] of a large client organisation, and that nameservers 'G' [926] and 'I' [934]are behind a second firewall [120]. Server application process 'u' [600]executes on host 'a' [500], belonging to a different service organisation at the left of firewall [100], and needs to provide a special service onlyto client application processes behind the embedded firewall [120], such as process 'v' [610] executing on host 'b' [510]. For this purpose, it makes the defining request '//F/G/I/x', typically as instructed by an authority in the client organisation, which eventually results in the context 'x' being defined on on nameserver 'I' [934]. In order to prevent unauthorised "trojan horse" service providers, the client authority would have supplied an encrypted authentication ticket to the service organisation, to be included with the defining request as opaque data, which can be verified successively at nameservers'F' [912], 'G' [926] and 'I' [934]before granting the request. Client process 'v' [610] could be likewise required to supply an authentication ticket with its referencing request by nameserver 'E' [924] before passing the request onward to nameserver 'F' [912], and even by nameservers'H' [932], 'G' [926] and 'I' [934], for example, if the offered service carries license restrictions and is not for free. This could be implemented, for instance, by process 'u' [600] supplying some additional parameters describing the license restriction together with its defining request, to be locally applied at final nameserver 'I' [934] to subsequent referencing requests received for that context. In this case, the nameserver 'I' acts not only as an exchange for the service, but also as the authenticating agent. Alternatively, the parameters could be used specify that the referencing requests be passed back to the server process 'u' [600] for verification, the logical connection being then granted by nameserver 'I' [934] only if the server process 'u' [600] responds with an approval. Another possibility is to allow the logical connection to proceed anyway, with the construction of the end-to-end service path, and to have the authentication tickets verified during the signalling process, for instance, by host 'a' [500] accepting or refusing to complete the virtual path to process 'u' [600]. It should be clear that, principally because of the existence and availability of service paths, the present invention allows a large gamut of such choices to the implementer.

Remaining to be considered are the application and user interface issues, along with those of host implementation and multipoint connectivity. As already described, the for requesting connections is not much different from prior art, except that actual host addresses, such as IPv4's 32-bit addresses, can no longer be used and that the context pathnames do not contain order-reversals and are not suitable for identifying or locating the hosts of server applications. More serious is the implication that application processes, such as web servers, can no longer use the 32-bit addresses to identify the peer end-points of their network connections, for purposes like logging. Logging by address avoids the considerable overhead of DNS lookup, especially for the less frequent clients from distant locations, whose lookups tend to take the longest times. Unfortunately, subsequent DNS lookups of the logged addresses become less accurate with time, as the addresses and their DNS names keep changing. Moreover, the addresses are as such losing their effectiveness in identifying or locating the clients because of the increasing use of dynamic address allocation and firewalls.

In the present invention, the end-to-end service paths constructed by client requests are immediately available to the server processes, and directly provide DNS-like identification of the client without any additional lookups over the network. The advantage is real, and not an artifact of hidden costs elsewhere, because the service paths are already constructed by the client's referencing requests. The latter are likely to be more efficient than the DNS lookups incurred in prior art, since they only involve propagation along routes specified by the applications themselves in the form of pathnames, and furthermore, the signalling is only performed once for the duration of the connection. There are nevertheless advantages to identifying individual connections or clients by number, for example, in compacting log files and collecting usage statistics. Both requirements are easily achieved by server applications in the present invention: the first, by the simple expedience of counting each acceptance of a client connection, and the second, by constructing a hash table to efficiently remember and distinguish the client service paths.

A further feature of the present invention is that with the context pathnames becoming the only form of network reference, the client requests no longer have the point-to-point flavour that was unavoidable in prior art networking APIs including the socket system calls. This makes the present invention conducive to distributed parallel processing, ie. with direct messaging between multiple processes, in place of the traditional client-server architecture, where the client processes typically do not talk directly to one another. For this reason, it is advantageous to implement the capability, as in MPI, to acquire and use a single handle in an application process as input/output (I/O) handle to multiple peers, from which a desired peer end point can be dynamically selected in each I/O call by an optional argument. The POSIX readx( ) and writex( ) extended I/O system calls support such an extra argument and are readily used in implementing the present invention:

```
extern int fd, peerno; /* context file descriptor&peer id */
extern char inbuff[ ], outbuff[ ]; /* data buffers */
int nbytes=readx (fd, inbuff, sizeof (inbuff), peerno);
writex (fd, outbuff, sizeof (outbuff), peerno);
```

The usage requires that the file descriptor fd be associated with multiple transport paths, each leading to a file descriptor on a peer process on a possibly different host. A straightforward implementation to achieve this would be as a table of references to the remote file descriptors linked to a table of transport path handles to the corresponding hosts. Both tables need to be automatically set up by the multipoint support software within the operating system, since the application process only makes a single referencing request to be connected into the multipoint context. The support software also needs to automatically update the tables whenever a peer process joins the group, exits, or opens or closes a file descriptor relating to this context. A service protocol is necessary between the operating systems of each of these processes for exchanging the information necessary to set up and update these tables.

Such provisions are meaningful only if additional peer-to-peer transport paths automatically to "mirror" the unode tables across the participating hosts. In the above example, three processes'u' [600] on host 'a' [500],'v' [610] on host 'b' [510] and'w' [620] on host 'c' [520] obtained connections into the same context defined by the universal pathname '//F/G/I/x'. Service and transport paths between processes 'u' and 'v' and between processes 'u' and 'w'were established actively, ie. by requests made by the processes themselves. For true multipoint capability, it is necessary to manufacture transport paths also between processes 'v' and 'w', without a separate request being made by either process. From FIG. 1, the most likely transport path available for process 'w' [620] on host 'c' [520] is clearly 'a.p.q.r.c', and for process 'v' [610], on host 'b' [510], there are two possible transport paths, 'a.p.q.r.s.b' and 'a.p.q.s.b', either or both of which may be already established. These two sets of paths are in fact sufficient for computing and establishing the third set, between processes 'v' and 'w', again without requiring non-local addressing. Matching one path from each set say 'a.p.q.r.c' and 'a.p.q.s.b', and starting from the common end 'a', one arrives at the switch 'q' where the paths diverge. The desired transport path is obtained by reversing the remaining part of one path and concatenating to the other, to obtain 'c.r.s.b'. The same can be done for the service paths; assuming the service path obtained for process 'w' [620] to have been 'a!A!B!F!G!c', and taking the previously obtained service path 'a!A!B!F!E!b'for process 'v' [610], one gets the result 'c!G!F!E!b', where the common nameserver 'F' [912]cannot be eliminated because nameservers 'E' [924] and 'G' [926]have no direct connection between them. By the configuration data assumed in Table 1, nameservers 'F' [912] and 'E' [924] are adequate for the signalling necessary to establish the new transport path 'c.r.s.b'.

Additionally, the implementation should allow each valid peer number to be queried for the associated service path, in order to identify the peer process in a humanly comprehensible way. It is also useful, but not mandatory, for an implementation to strive to keep such tables at each of the peer processes in sync, again by service interaction between the respective operating systems, so that a given peer number always refers to the same process and file descriptor at any of its peers. In such implementations, the set of valid peer numbers effectively forms a virtual address space, valid only in the context of the associated file descriptors possessed by the participating processes.

Another useful feature to implement in a given embodiment is separation of the defining and referencing requests from the lifetime of the requesting process. The resulting persistence is important, for instance, for supporting network file systems (NFS), in which the referencing request should be made only once when mounting a remote file system on the local file tree. The service and transport paths should remain available within the operating system for serving subsequent client processes and user commands until the remote file system is unmounted. Such persistent connections could also be used by the service protocol between the operating systems on multiple hosts, for updating and maintaining in sync the transport path tables associated with a given context in order to support multipoint connections as just described.

Figure 4:
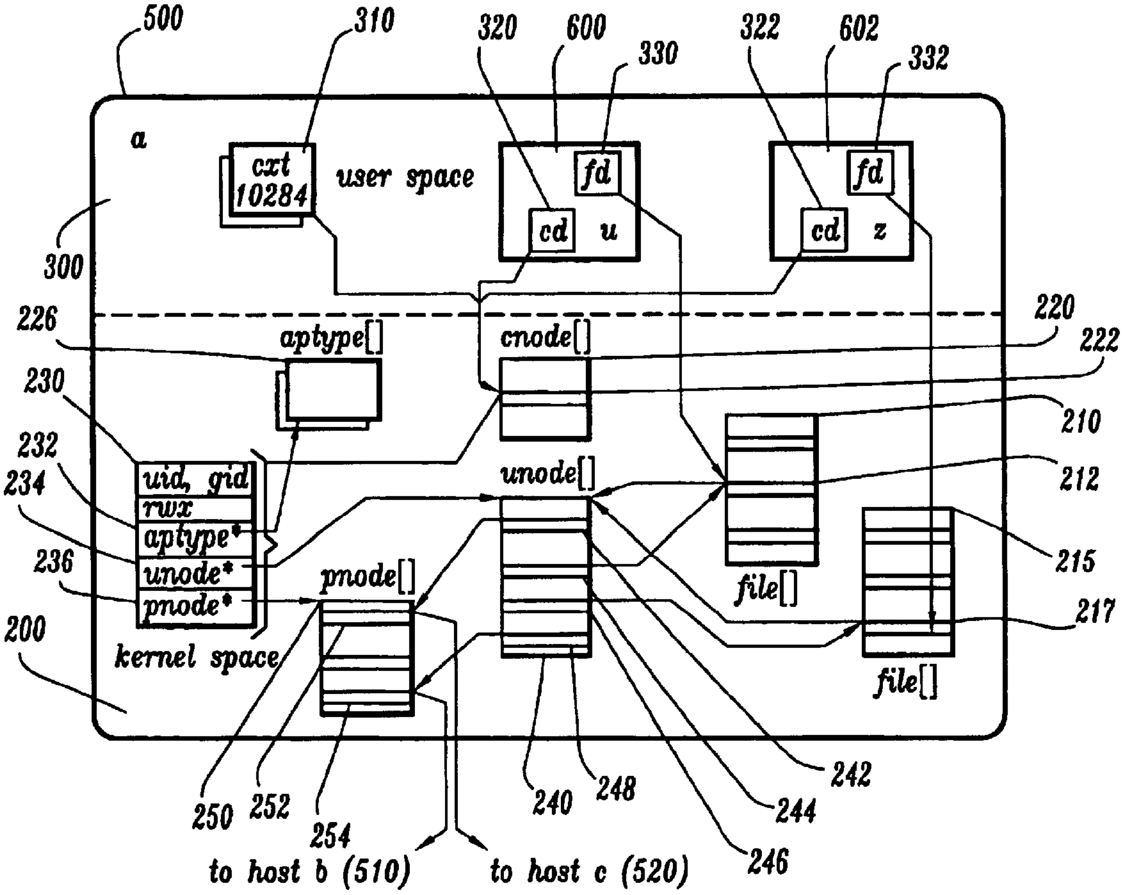
FIG. 4 illustrates a typical implementation of the present invention in a Unix-like operating system.

Both features can be elegantly achieved on Unix-like systems by defining three new kinds of kernel objects:pnodes or transport path handles to the peer hosts,unodes or user-nodes representing the file descriptors, andcnodes or context-nodes with process-independent existence and visibility in the user space like files. These objects and their relation to the application processes are illustrated in FIG. 4, which shows two application processes,'u' [600] and 'z' [602] both executing on host 'a' [500] and accessing the same cnode data structure [222] via context descriptors, [320] and [322], respectively, which are integers analogous to the Unix process and System V IPC ids and index or hash into the cnode table [220]. Each cnode, which is an element in the cnode table, may carry ownership and access control parameters, as illustrated by the blown up representation [230], say in the form of the Unix uid, gid and rwx-permission bits, set at the time of creation, as will be described, as well as pointers to a table [240] of unodes and a table [250] of pnodes belonging to that cnode. Each unode corresponds to an open file descriptor within the group of participating processes, but not necessarily on the same host. In the figure, unodes [242] and [248] refer to "foreign" file descriptors, belonging to peer processes executing on other hosts 'c' [520] and 'b' [5 10], respectively. Accordingly, unode [242] points to pnode [252] leading to host 'c' [520], and unode [248] points to pnode [254] leading to host 'b' [510]. The "local" file descriptors [330] and [332], held by processes'u' [600] and 'z' [602], respectively, are small integers and index into the respective file tables[210] and [215] to the file structure entries that point to the unode table [240] (not individual unodes) for that context. The associated unodes [244] and [246]carry references back to these file descriptors ([330] and [332], respectively), though not necessarily as raw pointers since the unode references are needed when data is received from the network and the receiving process and its file table may be swapped or paged out to disk at that time.

It is particularly convenient to implement either a /proc-like pseudo-file system, or a set of commands analogous to those in System V Inter-Process Communication (IPC) support, for listing and manipulating the cnodes, as illustrated by the following ksh (Korn shell) commands:

```
$ . /usr/include/cxts/aptypes.sh              # read APTYPE defs
$ echo (mkcxt MYAPTYPE 0755)                  # create a cnode
                    10284
$ cxts                                        # list cnodes
                      CID  MODE               UID    GID  . . .
                    10284  --rwxr-xr-x        3838   200  . . .
$ rmcxt             10284                     # delete cnode
```

```
-continued
8    $ cxts
9                 CID   MODE      UID    GID  ...
```

Such mechanisms serve to give user-space visibility, through the command line or graphic user interfaces (GUIs), to individual cnodes, as if they were real objects, like the "image" [310] of cnode [230]. The reference would still be through a context descriptor held by the pseudo-file system or IPC-like command, that indexes or hashes into the cnode table [220]as indicated in the figure.

Commands cxts and cxts have the System V IPC shared memory equivalentsipcs -m and ipcrm -m, respectively, and the shared memory equivalent of mkcxt can be obtained by writing a small C program invoking the shmget system call. The above commands would be similarly implemented as programs invoking corresponding system calls for creating and manipulating or deleting cnodes:

```
1    #include <sys/types.h>
2    typedef int cid_t, aptype_t;
3    cid_t context (aptype_t, mode_t, void*);
4    int cntl (cid_t, int cmd, void* optargs);    /* including deletion */
```

where the third argument of the context system call is for passing an optional data structure as argument, such as QoS parameters, depending on the application-type selected by the first argument.Cntl is a generalisation of the ioctl call applicable to file descriptors, and is used for a variety of purposes including closure, or deletion, of the cnode. The application-type is intended to allow selection of the transport type (eg. stream or datagram) and protocol, as in the socket system call, as well as of the connection management capabilities introduced by the present invention and particularly relevant to multipoint connectivity. These and other system calls introduced below are only intended to suggest the general structure, and the syntax and the supported features may vary considerably between implementations.

The cnodes may be used for local IPC between processes and threads on a given host, or conversely, the usual IPC mechanisms may be reimplemented by wrapper code using the cnode implementation. For message I/O using the cnodes, an additional system call provides file descriptors that can be used via the POSIX readx/writex system calls as already mentioned:
1 #include <sys/types.h>
2 include <sys/context.h>
3 fd_t copen (cid_t, mode_t, void* optarg, int optarglen);
An adequate implementation can be obtained by modifying existing message queue IPC sources, such as those in the free Linux or FreeBSD operating systems, the changes being principally to construct file descriptors and to use the last argument of the POSIX readx/writex calls in place of the message type encoding employed in the existing msgsnd( ) and msgrcv( ) IPC system calls.

Two additional system calls, or their equivalents, are necessary for the purposes of the present invention:
1 #include <sys/context.h>
2 int cbind (cid_t, const char* pathname, void* optargs, int optarglen);
3 cid_t cget (const char* pathname, mode_t, void* optargs, int optarglen);
The first of these is defined to make a defining request (Ex. 1) to the operating system, whence it is propagated as already described. If successful, the service network returns a request service path, or some form of reference thereto, depending on the implementation; the returned information is then internally linked to the existing cnode specified by the first argument to the call. Among other things, the optional arguments may be used, in an implementation-specific format, to designate the defined context being intended for multipoint connectivity. Correspondingly, the second system call, cget, is meant for making a referencing request (Ex. 2), which is again propagated as described. The call does not take a cnode as argument; instead, if the request is successful, a file descriptor or a cnode is manufactured and linked to the results of the request, depending on whether the referenced context was designated, at the time of its definition, to support point-to-point or multipoint connectivity. In the first case, the transport path resulting from the request is directly suitable, and meant, for application data, analogous to the socket descriptor returned by the connect system call in the sockets API.

In the multipoint case, the returned transport path cannot be adequate for subsequent application I/O, since it only leads to the defining host. It is conceivable that the application may be designed to operate in a star-topology, so that all communication would be routed through the defining process, but this would be at best a special case. Besides, the defining process would still need to be able to handle multiple, simultaneous connections from other processes, and it would be desirable to use the same data structures inside the operating system to support both defining and referencing processes. Additionally, in a symmetric multipoint application, it should be possible to transfer connection management responsibilities from the original defining process or host to any of the peer processes. Further to be noted is that the number of transport path handles at a given participating host need not correspond to the number of unodes, or even to the number of participating hosts, since the transport could be arranged in the form of a ring, requiring only one inbound path and one outbound path at each host. The operating system layer must accordingly multiplex the application data, and may use the multiplexing to include service communication with the operating systems on the remaining hosts. Such service communication is necessary, for instance, because the information for setting up and managing the unode table entries, as well as pnodes leading to the peer hosts, must be transparently obtained from the defining host operating system.

Accordingly, the transport path returned by the referencing request is best saved by creating a local cnode, with the added benefit that later references to the same context by other processes on the same host can be avoided by reusing this cnode. A subsequent copen system call to the cnode is then necessary for acquiring a file descriptor for the application I/O. The operating system responds by requesting the defining host operating system, via the saved transport path, for a new connection into the context. If granted, the defining host creates a new entry in the unode table associated with its defining cnode, and instructs each of the peer host operating systems, via the respective transport path handles kept in its associated pnode table, to update their unode and pnode tables.

TABLE 2

System calls summary and comparison

| Function | Contexts | | Sockets | |
|---|---|---|---|---|
| | Server processes | Client processes | Server processes | Client processes |
| Service handles | cd = context () | - - - no call - - - | sd = socket () | fd = socket () |
| Definition & reference | cbind (path) | fd = cget (path<br>- - - or - - -<br>cd = cget (path)† | bind (sd)<br>listen (sd) | bind (fd)‡ |
| Transport handles | fd = copen (cd) | fd = copen (cd)† | fd = accept (sd) | connect (fd, ip) |
| Transport termination | close (fd) | close (fd) | close (fd) | close (fd) |
| Service termination | close (cd)<br>cntl (cd, RMCXT) | close (cd)†<br>cntl (cd, RMCXT)† | close (sd) | |

†only for multipoint connections
‡only some clients like FTP

The above system calls and their usage are summarised in Table 2, which shows their close similarity to those of the sockets API. In both APIs, the server application processes define their respective services and accordingly need to invoke more system calls than the client processes which merely avail of the defined services. Typically, in a sockets-based server process, a socket handle, or socket for short, is first created by invoking the socket system call, and then bound to a port address on the host, by calling bind, before calling listen to instruct the operating system to actually prepare for receiving client requests. The host address and port number serve as the network address (indicated by ip in the table) for the service that a client process must specify for establishing the logical connection and transport with the connect call. The server process must correspondingly cal-laccept to accept each client connection as a separate transport handle (file descriptor). Note that the client socket is itself first created by a separate socket call, to allow some applications, like FTP, to bind their client sockets, so that the corresponding server processes may then use connect for obtaining additional connections to a given client. The basic difference from the contexts API already described is that the binding is on a nameserver defined by the path argument, and has no direct implication of the server host address. The remaining system calls are closely equivalent,copen playing essentially the same role asaccept and connect in the sockets API, and the special cntl being separately called with the RMCXT argument for instance, via the rmcxt command already described, to destroy the cnode.

As already stated, these system call definitions are only indicative of the best manner of realisation of the present invention. To see their usage and operation, consider again the previous examples of the defining and referencing requests made by processes ‘u’ [600] and ‘v’ [610]. Process ‘u’ [600] would execute the following C code to make the defining request of Ex. 1, and subsequently accept and serve clients:

```
1    #include <sys/types.h>
2    #include <sys/context.h>i
3    #nclude <sys/aptypes.h>
4
5    extern void serveclient (int fd);
6    extern void diagnose ( );
7    const char *path = "//F/G/I/x";
8    int cid, ret;
9    . . .
10   /* define context on nameserver //F/G/I */
```

-continued

```
11   cid = context (TCP_APTYPE, 0755, 0); /* create local cnode */
12   ret = cbind (path, CLIENT_SERVER_TYPE);
13   if (ret != 0) diagnose ( );
14   . . .
15   /* handle clients */
16   for (;;) {
17           fd = copen (cid, 0, 0);
18           if (fd < 0) diagnose ( );
19           if (! fork ( ) serveclient (fd);
20           }
```

On executing line 11, first a free entry [222] is found in the cnode table [220]and allocated; an index or a hash to this entry is to be eventually returned to the process as the context descriptor, cid. An implementation may restrict the total number of cnodes in order to support fast hashing into the table by context descriptors. After allocation, the contents of the cnode [222], as shown in detail by the structure [230], are initialised. The ownership parameters uid and gid are set from the corresponding values of calling process‘u’, and the permission bits are taken from the second argument of the call, viz. 0755. The first argument, TCP_APTYPE, is treated as an index, as indicated by the pointer [232], into an internal switch table [226]subroutine entry point vectors specific to each of the application types supported by the implementation, as will be described. A unode table [240] and a pnode table [250] are then allocated, initialised to zero size, and linked into the cnode [222] via pointers [234] and [236], respectively. The index or hash of the cnode in the cnode table [220] is then returned to the calling process as mentioned.

A somewhat simpler process is followed when process ‘v’ [610] at host ‘b’ [510]makes a referencing request by executing the typical C code

```
#include <sys/types.h>
#include <sys/context.h>i
#nclude <sys/aptypes.h>

extern void diagnose ( );
const char *path = "//F/G/I/x";
int fd, ret;
FILE * fp;
. . .
/* reference context on nameserver //F/G/I to get a client fd */
fd = cget (path, 0755, 0, 0); I
f (fd < 0) {
```

-continued

```
            perror (path);                  /* could not reach, etc. */
            exit (1);
            }
      fp = fdopen (fd, "r+");
      fprintf (fp, "GET addressless.ps HTTPcx/1.0nn");
      fflush (fp);
```

Figure 5:
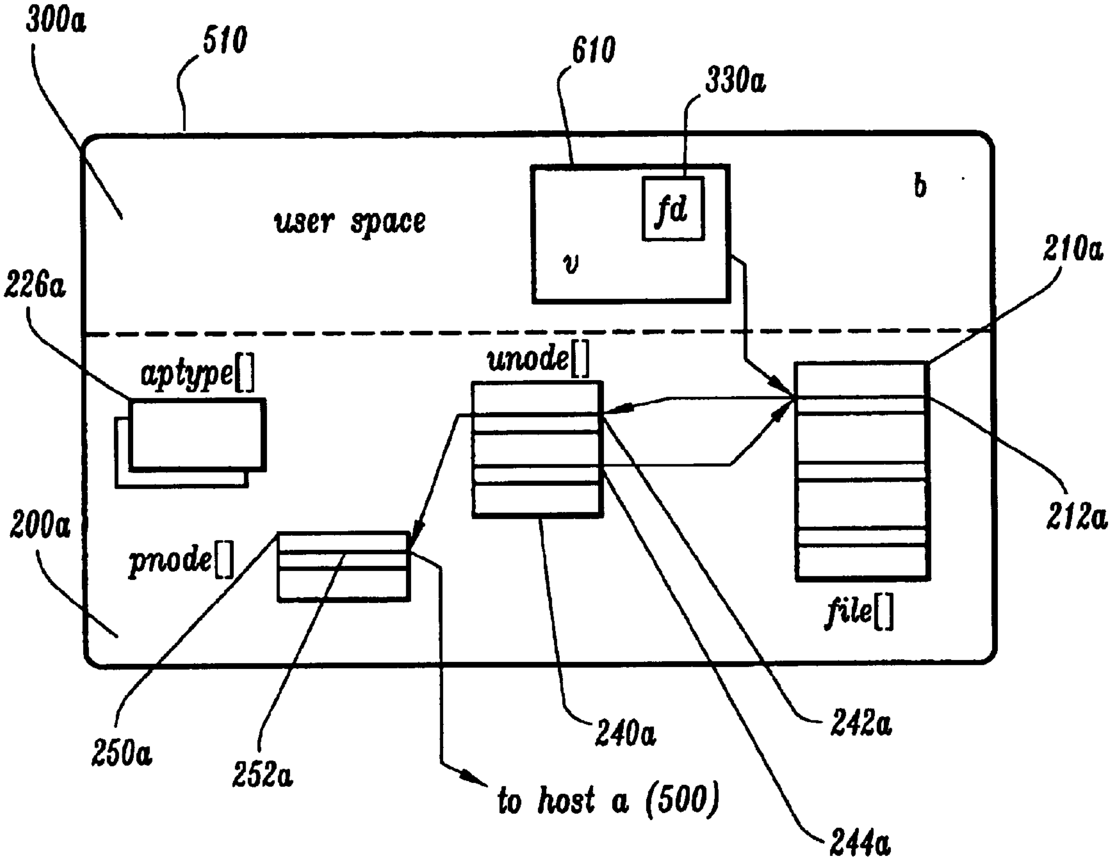
FIG. 5 illustrates operating system data structures used by a simple client application process in accordance with the present invention.

The referencing request is again made by the operating system [200*a*], and a transport path handle obtained, on success, leading to the server process 'u' [600] on host 'a' [500]. Only a file structure [212*a*] is allocated in the file table [210a] of process 'v' [610](FIG. 5), a one-entry pnode table [250*a*] is created and the entry [252*a*] initialised with the transport path handle, and a short unode table [240*a*] is then allocated with two entries, unode [242*a*] linking to the pnode [252*a*] and unode [244*a*] linking back to the file structure [212*a*]. The file operations of [212*a*] are linked to those supplied by the application type module, associated with the referenced context, accessible in the application types table [226*a*]. The application type index for identifying this module is also obtained from host 'a' [500]as a result of the referencing request.

Figure 6:
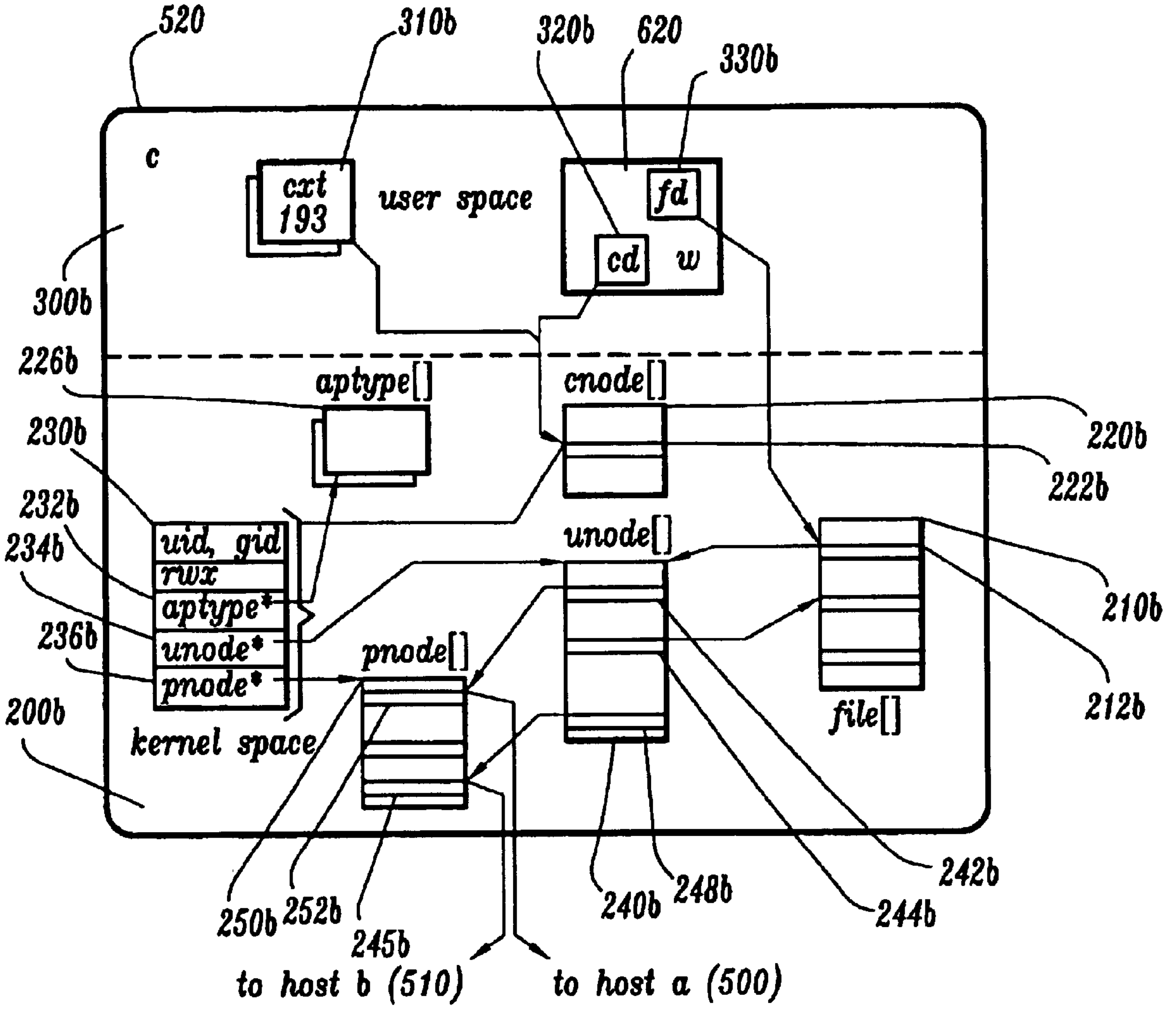
FIG. 6 illustrates the operating system data structures used by a multipoint client application process in accordance with the present invention.

A multipoint connection is more involved, as illustrated in FIG. 6. Consider process 'w' [620] on host 'c' [520]making a similar referencing request, but assuming that it instead acquires a multipoint connection to the same context. Such combinations are also permitted by the present invention, as suggested by the following C code for process 'w':

```
1   #include <sys/types.h>
2   #include <sys/context.h>
3   include <sys/aptypes.h>
4
5   extern void error (const char*);
6   const char *path = "//F/G/I/x";
7   const char *rqst = "HELLOn";
8   int cid, fd, opt, ret;
9   FILE * fp;
10  . . .
11  /* reference context on nameserver //F/G/I, with multi option */
12  opt = MULTIPOINT;
13  cid = cget (path, 0755, opt, sizeof (opt));
14  if (cid < 0)
15        error (path);
16  fd = copen (cid, 0, 0);
17  if (fd < 0)
18        error ("copen failed");
19  write (fd, rqst, strlen (rqst), 0);      /* 0 means server (dflt) */
```

The cget call, if successful, results in the allocation of a fresh cnode [222*b*] from the cnode table [220*b*], which may, once again, be manipulated by commands as if it were an object [310*b*] in the user space [300*b*] on host 'c' [520]. The application type index is once again obtained from the context defining host 'a' [500], for linking the application type pointer [232*b*] in cnode [222*b*], as shown in the detailed view [230*b*], to the correct entry in the application types table [226*b*]. Process 'w' [620] needs to make a subsequent copen call (line 13) to obtain a file descriptor [330*b*] that links, via the file structure [212*b*] in the process file table [210*b*], to the unode table [240*b*] created for the cnode, and linked to it by a pointer [234*b*] in the cnode structure [230*b*]. The remaining data structures are identical in construction and purpose to those of the defining host 'a' [500] (FIG. 4).

A sample application type switch table entry from an actual implementation is listed below:

```
typedef struct cnode_t CNode;
typedef struct unode_t UNode;
typedef struct aptype_t ApType;
struct aptype_t {
      char   *version;                 /* copyright, etc */
      int    aptypeid;
      int    state;                    /* 0: uninitialized */
      int    cnodes;                   /* number of actiye cnodes */
      int    clients;                  /* number of clients attached */
      int    flags;                    /* miscellaneous */

      int    (*halt) (void);           /* prep to unload */
      int    (*cntl) (void* arg);      /* called from syscall cntl( ) */
      int    (*open) (CNode*,int arg,int space);
      int    (*close) (CNode*);        /* from syscall cntl() */

      int    (*perm) (CNode*,int oflg,void* arg,int len,int sp);
      int    (*uopen) (UNode*,int oflg,void* arg,int len,int sp);
      int    (*uclose) (UNode*);       /* from close(), cntl() */
      };
```

The state variable is a flag used for coordinating dynamic loading of the application-type module into the kernel: it is set to a non-zero value after initialisation to prevent accidental unloading while it holds heap-allocated memory. The halt entry point must be first called to free such storage, if any, from within the kernel. The variables cnodes and clients track the cnodes and the file descriptors from all application processes on that host which reference this module. A halt call would be presumably unsuccessful if either of these reference counters are positive—all cnodes of a given application type must be deleted, after all the associated file descriptors have been closed, before the module can be halted and unloaded. The open, close and cntl entry points are invoked when a cnode of this application type is created (context or cget system calls), closed (cntl with command argument specifying "delete"), or subjected to other predefined manipulations indirectly via cntl with command argument directing the action to the application type instead of the cnode itself, for example:

```
$ ./usr/include/cxts/context.sh          #read defs
$ cntl (10284, APTYPE_PRINT_REFCOUNTS)
        CNODES          FILEDES
          3               10
```

The uopen and uclose entry points are called whenever a unode is created or destroyed, typically via a copen call by a process on the local host or by a peer process on a remote host; in the latter case, service interaction occurs between the operating systems on both hosts, for "mirroring" the new unode on the local host. Before allocating the unode and calling uopen to initialise it,perm is first called to check the permissions and allow the application type module to allow or deny connection, based on the credentials and optional authentication parameters from the calling process, as well as considerations such as the current reference counts, etc. In addition, each application type module supplies a standard set of file operation subroutines, or fileops, by calling an implementation specific kernel function, to be associated with each file descriptor, for handling the readx, writex, ioctl and closesystem calls that are made to the file descriptor.

A main advantage of the present invention is that it elegantly and efficiently decouples the logical connectivity issues from those of implementing the associated data transports. This can be achieved by using nameservers as exchanges between application processes, rather than as address dictionaries as in prior art, by linking the nameservers in a logical path structure, so as to define logical paths, and by exploiting the geographical and network topological relations between nameservers and switches in the transport media to automatically translate the logical paths into physical routes through the media and establish the corresponding virtual paths for transport. Among other things, the approach generalised the notion of URLs and eliminates the distinction between hostnames and filenames in the URLs of prior art, and allows services to be offered via advertised locations, including behind client firewalls or inside foreign countries rather than at the geographical locations and host addresses of the server processes, in a generic manner distinct from that currently achieved by firewall and web technologies.

Ample opportunity also results for implementing security, authentication, parallel and distributed techniques, in new ways as described and as would be obvious to those skilled in the emerging Internet technologies, as well as for novel application systems that are difficult or impossible today because of the limitations of address-oriented networking. Considerable latitude also exists in the implementation of the service protocol between the hosts and the nameservers; of the signalling protocol between the hosts, the nameservers and the switches, for realising such advantages; and of the host application interfaces including system call APIs, user commands etc. In addition, the present invention promises considerable savings in future of the Internet by alleviating the urgency for migrating to IPv6 and obviating the associated infrastructure replacement, and more rapid growth by eliminating the current piece-meal approach in the development of Internet protocols and applications. Lastly, the present invention can be easily deployed over existing networks, as illustrated by the description of the preferred embodiment, to realise most of these advantages.

Although the invention has been described with reference to preferred embodiments, it will be appreciated by one of ordinary skill in the arts of parallel distributed computation, networking and Internet technologies, that numerous modifications are possible in the light of the above disclosure. All such variations and modifications are intended to be within the scope and spirit of the invention as defined in the claims appended hereto.

What is claimed is:

1. A method for providing logical connectivity for data transport between application processes executing on a set of hosts, comprising the steps of:

a first application process on a first host making a defining request supplying a first name sequence including names of a plurality of nameservers and a key, said defining request being passed to successive ones of said plurality of nameservers, said key being used by name binding means at the last of said successive nameservers for retaining said first sequence;

a second application process on a second host making a reference request supplying a second name sequence including said key and a second sequences of names of a second plurality of nameservers, said reference request being passed through successive ones of said second plurality of nameservers;

recalling the retained first sequence by name binding means at the last of said successive nameservers using said key, to construct an end-to-end service sequence and combining said first and second sequences;

communicating said end-to-end service sequence and signalling parameters by combining said first and second sequences among said first and second plurality of nameservers;

translating said end-to-end service sequence into one or more end-to-end transport paths over a transport network; and setting up virtual path table entries identified by said end-to-end transport paths to set up virtual paths between the first and the second application processes.

2. The method of claim 1, further comprising a plurality of second application processes making said reference requests with the same name interpreted as said key, and said virtual paths being correspondingly set up for each of the second application processes.

3. The method of claim 2, further comprising:

retaining the sequence and optional additional parameters from one or more of said reference requests from said second application processes;

constructing end-to-end service sequences and optional signalling parameters for each combination of said retained sequences and parameters:

applying routing rules to each of said constructed end-to-end service sequences to obtain one or more corresponding transport paths; and setting up virtual path table entries on switching means identified by each obtained transport path to set up additional virtual paths between said first and said second application processes.

4. The method of claim 3, wherein said sequence and parameter retention and service sequence and signalling parameters construction is performed by said name binding means on a last ones of said plurality of nameservers.

5. The method of claim 3, wherein said sequence and parameter retention and service sequences and signalling parameters construction is performed by said first application process.

6. The method of claim 5, wherein first and second additional parameters are used by said name binding means to selectively construct said combinations.

7. The method of claim 3, wherein said routing rules are dynamically generated.

8. The method of claim 1, wherein additional parameters are used for authentication of said second process by first service communication means.

9. The method of claim 1, wherein first additional parameters define the quality of service to be applied by signalling means when setting up said virtual paths.

10. The method of claim 9, wherein one or more of said transport paths employs ATM, said signalling means employs ATM signalling and one or more of said virtual paths employs the virtual paths supplied by AAL5.

11. The method of claim 1, wherein each of said names comprises human readable text and the name sequences are supplied as text strings according to a pathname convention to be interpreted as names in a hierarchy.

12. The method of claim 11, wherein more than one of said nameservers are interpreted as a root of the hierarchy.

13. The method of claim 1, wherein one or more of said transport paths employs IP.

14. The method of claim 13, wherein more than one of said transport paths employing IP involve the same IP addresses.

15. The method of claim 1, wherein one or more of said transport paths employs Ethernet or Token-ring adapters and the corresponding virtual paths directly employ Ethernet or Token-ring addressing, respectively.

16. A system for providing logical connectivity for data transport between application processes executing on a set of hosts, comprising:

a transport network of physical data transport means connecting said hosts for transporting data using virtual paths, said transport network having virtual path switching means for setting up virtual tables and said virtual paths;

a service network of a plurality of nameservers, each associated with a name;

requesting means on each of said hosts to enable application processes to make a defining or referencing request by supplying a sequence of names and optional additional parameters to a specific nameserver;

routing means to provide one or more of the nameservers and the hosts with route translation rules corresponding to the connections in said transport network;

first service communication means connected between said hosts and said nameservers for interpreting as a key a name in each name sequence supplied by said request and to interpret each of the remaining names in said sequence as said name of said nameserver to communicate said requests among said nameserver and said hosts; and name binding means at one or more of said nameservers to retain the name sequence and optional parameters supplied by each of said defining request under said key to recall the retained name sequence and the optional parameters in response to each said referencing requests, yielding the same key as the corresponding retained name sequence, to construct an end-to-end service sequence by combining the retained and referencing sequences and optional parameters.

17. The system as in claim 16, further including:

second service communication means between said hosts and said nameservers for communicating said end-to-end service sequences including optional parameters.

18. A method for establishing connectivity and communication for one or more user processes executing on hosts connected by a network, wherein each of said hosts is capable of providing a logical end point for underlying virtual network but uses a context name as a conceptual point of connection and includes an operating system and context management means for managing connectivity associated with said context name, a first one of said hosts includes nameserver means for storing said context name, and a second or said first one of said hosts includes an owner process to create and register said context management means on its respective host under said context name on said nameserver means, the method comprising the steps of:

calling by said owner process said nameserver means and registering under said context said context management means on the host of said owner process;

calling by one of said user processes said nameserver means specifying said context name and requesting connection;

obtaining, independent of the underlying virtual network, by the operating system on the host of said calling user process, address of said context management means on the host of said owner process from said nameserver means;

establishing communication by said operating system on the host of said calling user process using said obtained address, including registering by the operating system on the host of said calling process its own address information with the operating system on the host of said owner process; and obtaining by the operating system on the host of said calling process the address information similarly registered by other said user processes with the operating system on the host of said owner process.

* * * * *